(12) United States Patent
Edgington et al.

(10) Patent No.: US 8,762,150 B2
(45) Date of Patent: Jun. 24, 2014

(54) USING CODEC PARAMETERS FOR ENDPOINT DETECTION IN SPEECH RECOGNITION

(75) Inventors: Michael D. Edgington, Bridgewater, MA (US); Stephen W. Laverty, Worcester, MA (US); Gunnar Evermann, Boston, MA (US)

(73) Assignee: Nuance Communications, Inc., Burlington, MA (US)

(*) Notice: Subject to any disclaimer, the term of this patent is extended or adjusted under 35 U.S.C. 154(b) by 794 days.

(21) Appl. No.: 12/883,901

(22) Filed: Sep. 16, 2010

(65) Prior Publication Data

US 2012/0072211 A1    Mar. 22, 2012

(51) Int. Cl.
*G10L 15/04* (2013.01)
*G10L 19/00* (2013.01)
*G10L 15/00* (2013.01)

(52) U.S. Cl.
USPC ............................ 704/253; 704/219; 704/231

(58) Field of Classification Search
USPC ........................................ 704/219, 231–257
See application file for complete search history.

(56) References Cited

U.S. PATENT DOCUMENTS

| | | | |
|---|---|---|---|
| 4,672,669 A * | 6/1987 | DesBlache et al. | 704/237 |
| 5,774,847 A * | 6/1998 | Chu et al. | 704/237 |
| 6,711,536 B2 | 3/2004 | Rees | |
| 6,782,363 B2 | 8/2004 | Lee et al. | |
| 7,016,836 B1 * | 3/2006 | Yoda | 704/233 |
| 2002/0184017 A1 * | 12/2002 | Lee et al. | 704/236 |
| 2003/0061036 A1 * | 3/2003 | Garudadri et al. | 704/208 |
| 2003/0061042 A1 * | 3/2003 | Garudadri | 704/254 |
| 2004/0073428 A1 | 4/2004 | Zlokarnik et al. | |
| 2005/0171768 A1 * | 8/2005 | Gierach | 704/208 |
| 2006/0088065 A1 * | 4/2006 | Khatter | 370/528 |
| 2007/0265851 A1 * | 11/2007 | Ben-David et al. | 704/270.1 |
| 2009/0299740 A1 * | 12/2009 | Jeong et al. | 704/226 |

* cited by examiner

*Primary Examiner* — Samuel G Neway
(74) *Attorney, Agent, or Firm* — Wolf, Greenfield & Sacks, P.C.

(57) ABSTRACT

Systems, methods and apparatus for determining an estimated endpoint of human speech in a sound wave received by a mobile device having a speech encoder for encoding the sound wave to produce an encoded representation of the sound wave. The estimated endpoint may be determined by analyzing information available from the speech encoder, without analyzing the sound wave directly and without producing a decoded representation of the sound wave. The encoded representation of the sound wave may be transmitted to a remote server for speech recognition processing, along with an indication of the estimated endpoint.

47 Claims, 7 Drawing Sheets

FIG. 7

USING CODEC PARAMETERS FOR ENDPOINT DETECTION IN SPEECH RECOGNITION

BACKGROUND

Automatic speech recognition ("ASR") systems are designed to process input audio signals containing human speech and convert the human speech into text. To improve the performance of an ASR system, a process known as "endpoint detection" (or "endpointing") is often performed on the input audio signal to estimate where the human speech begins and/or ends. For example, effective endpoint detection may remove portions of the input signal before or after speech begins, so that the system does not process audio including only silence, background noise (e.g., radio or other conversations) and/or non-speech sounds (e.g., breathing and coughing), thereby improving recognition accuracy and reducing system response time.

Various conventional techniques have been proposed to detect speech endpoints (e.g., speech to non-speech transitions and/or non-speech to speech transitions) in an input audio signal. These techniques analyze the input audio signal to determine one or more energy-related features of the signal, because the energy of speech sounds is typically greater than the energy of non-speech sounds. These techniques are computationally intensive.

Figure 1:
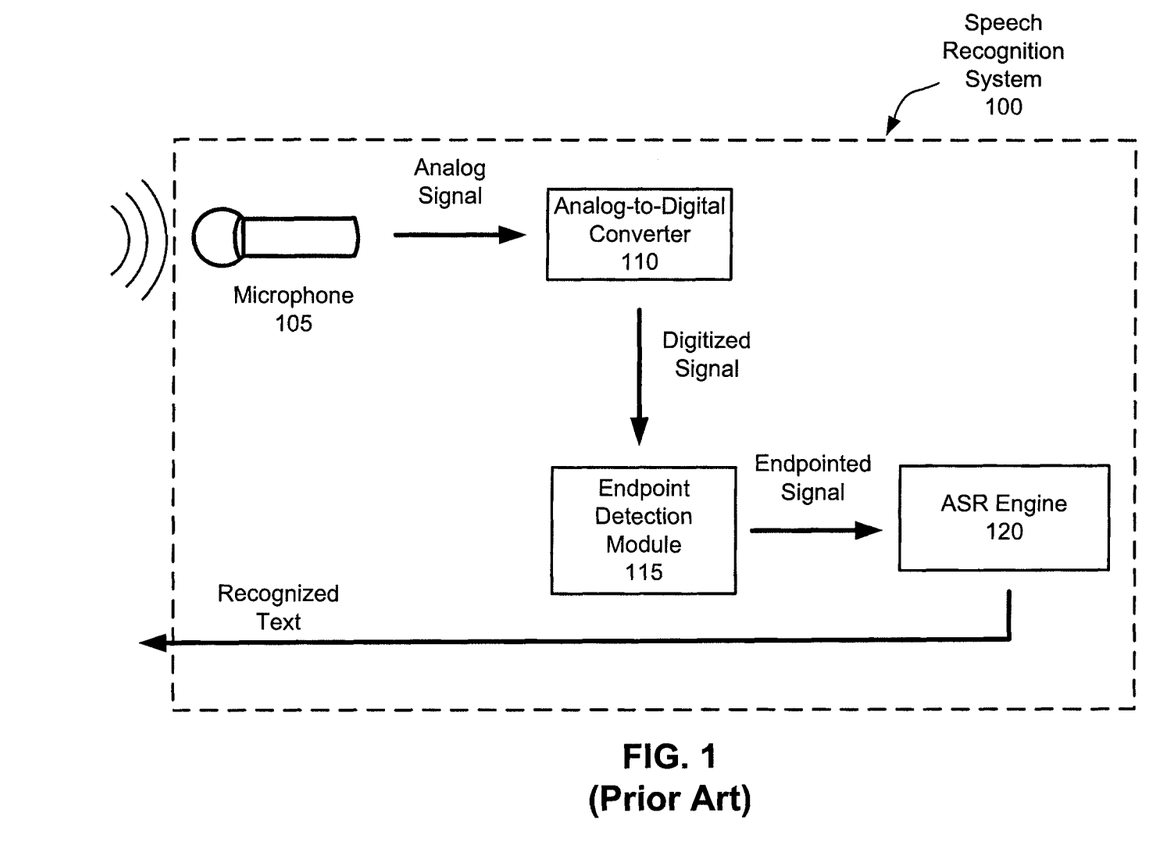
FIG. 1 illustrates an example of a conventional ASR system that implements endpoint detection.

FIG. 1 illustrates an example of a conventional ASR system 100 that implements endpoint detection. In this example, a microphone 105 converts speech sound waves into an electrical audio signal, which is then digitized (e.g., sampled and quantized) by an analog-to-digital converter ("ADC") 110. An endpoint detection module 115 processes the digitized signal to estimate where human speech begins and/or ends. The resulting endpointed signal is provided to an ASR engine 120 for processing into recognized text.

Because speech recognition tends to be computationally intensive, it is often difficult or unfeasible to implement a full ASR system on a device with limited resources, such as a mobile device with limited processing capabilities and storage reserves (e.g., a mobile phone, personal digital assistant, etc). Even on a device with sufficient resources, a full ASR system may be difficult to implement because the computing environment in which the ASR system is running (e.g., a Java Runtime Environment) may not make certain resources available to applications such as the ASR system. For example, the computing environment may not allow applications full access to the device's processing capabilities, or it may not expose to applications the raw speech data output by the ADC.

In some applications, a mobile device serves as a front end that captures an input audio signal and transmits the signal (or some processed representation thereof) to a backend server that performs speech recognition on the signal. An example of such an architecture is illustrated in FIG. 2.

Figure 2:
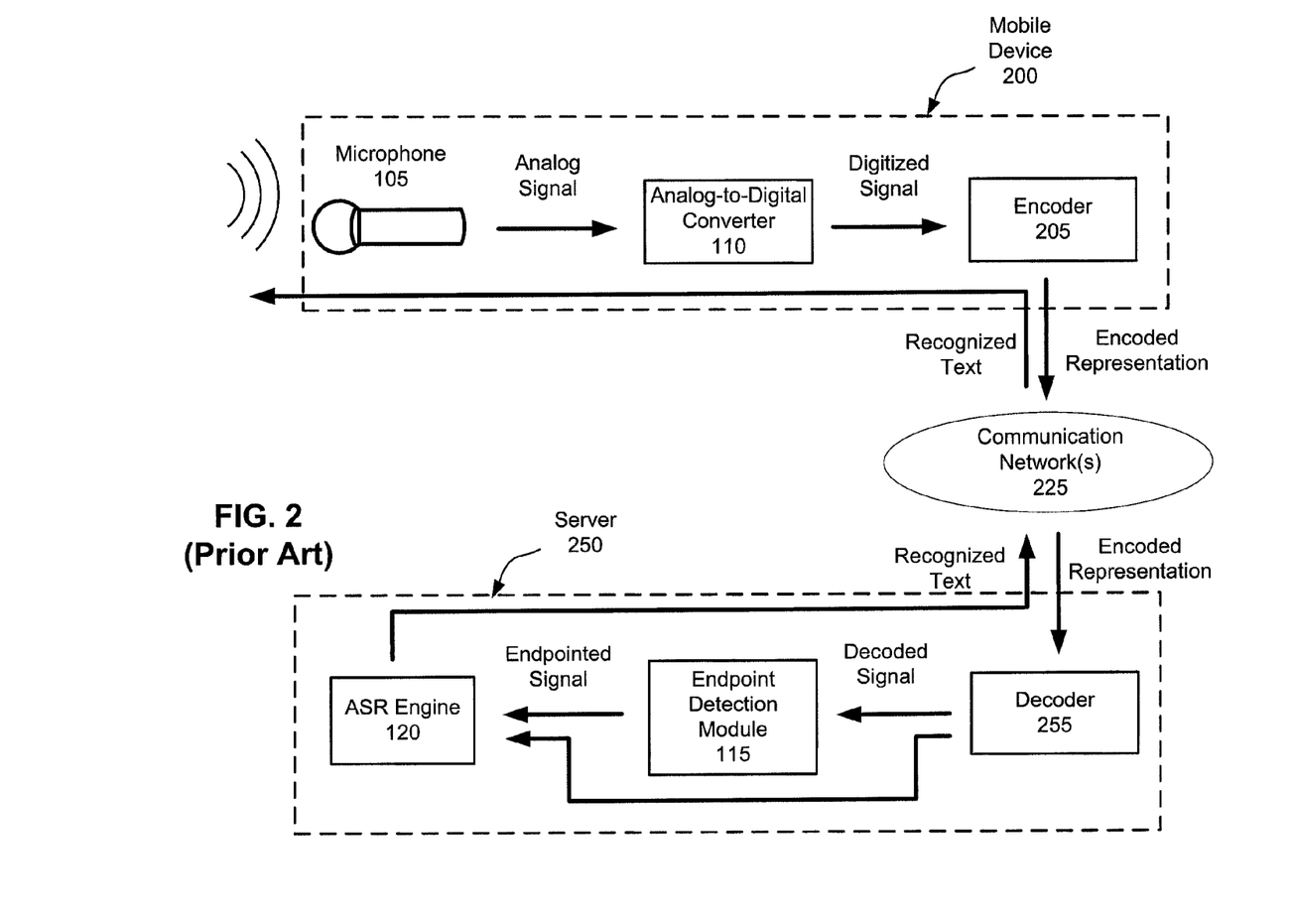
FIG. 2 illustrates a conventional architecture in which a mobile device serves as a front end that captures an input audio signal and transmits the signal to a backend server that performs speech recognition on the signal.

As shown in FIG. 2, a mobile device 200 includes a microphone 105 that converts speech sound waves into an electrical audio signal and an ADC 110 that digitizes the audio signal. An encoder 205 converts the digitized signal into an encoded representation that is more compact (i.e., compressed) or otherwise more suitable for transmission. The encoded signal is transmitted to the backend server 250 over one or more communication network(s) 225 and is decoded by a decoder 255 in the server 250. The output of the decoder 255 is a decoded signal that approximates the digitized signal prior to encoding. An endpoint detection module 115 performs endpointing on the decoded signal and provides the resulting endpointed signal to an ASR engine 120. The ASR performs speech recognition processing on the decoded signal, while being informed by the endpointed signal. The recognized text output by the ASR engine 120 is returned to the mobile device 200 via the communication network(s) 225, for example, to be displayed to a user of the mobile device 200.

SUMMARY

In some illustrative embodiment, a method is provided for use in a system comprising a first device that receives human speech and a second device that comprises a speech recognizer, wherein the first device receives at least one sound wave comprising the human speech and encodes the received at least one sound wave, via at least one speech encoder in the first device, to produce at least one encoded representation of the at least one sound wave, wherein the first device transmits the at least one encoded representation to the second device, wherein the second device decodes the at least one encoded representation and performs, via the speech recognizer, speech recognition on the human speech. The method, performed by the first device, comprises acts of: determining an estimated endpoint of the human speech in the at least one sound wave by analyzing information available from the at least one speech encoder, without analyzing the at least one sound wave and without producing a decoded representation of the at least one sound wave; and providing to the second device an indication of the estimated endpoint.

In some further embodiments, at least one non-transitory computer readable medium is provided, having encoded thereon instructions that, when executed by at least one processor, perform the above-described method.

In some further embodiments, a first device is provided for use in a system comprising at least one second device configured to decode at least one encoded representation of at least one sound wave comprising human speech, the at least one second device comprising a speech recognizer to perform speech recognition on the human speech. The first device comprises: at least one speech encoder to encode the at least one sound wave to produce the at least one encoded representation, the at least one sound wave being received at the first device; at least one endpoint detection circuit to determine an estimated endpoint of the human speech in the at least one sound wave by analyzing information available from the at least one speech encoder, without analyzing the at least one sound wave and without producing a decoded representation of the at least one sound wave; and at least one transmitter to transmit the at least one encoded representation of the at least one sound wave and an indication of the estimated endpoint to the at least one second device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not necessarily drawn to scale. For purposes of clarity, not every component may be labeled in every drawing.

DETAILED DESCRIPTION

The inventors have recognized that advantages could be achieved by providing endpoint detection at the front end mobile device that captures the audio signal. For example, until the mobile device recognizes that the user has stopped speaking, it may continue to encode and transmit the captured audio signal. This may lead to wasteful consumption of power and communication bandwidth by processing audio after the user has finished speaking. It may also have negative impacts on the user's experience, because the user may not receive any system response until after the mobile device receives an end-of-speech indication from the remote server, which, depending on network conditions, may be many seconds after the user stops speaking. For instance, the user's experience may be improved by providing a more timely response after the user stops speaking, such as visually displaying or audibly rendering a message to the user indicating that the system recognizes the end of his speech and that speech recognition processing is in progress.

Although some of these problems are ameliorated in systems that require a user to provide an indication (e.g., by pressing and/or releasing a button) when he starts speaking and/or when he stops speaking, a user may perceive such additional input operations as cumbersome. It may be desired to provide automatic endpoint detection at the mobile device so that the user does not need to indicate when he starts and/or stops speaking. Furthermore, manual input operations do not guarantee accurate endpoint detection, because the user may have poor timing for the input operations. For example, the user may press a "begin" button after he has already begun speaking, may press an "end" button before he stops speaking, or may forget to press the end button after he finishes speaking. Therefore, it may be desirable to perform endpoint detection based on the captured audio signal (or some suitable representation thereof), even in systems that employ manual input operations.

The inventors have further recognized and appreciated that conventional endpointing techniques are often unsuitable for use on a front end mobile device. Many mobile devices (e.g., mobile phones) use specialized microprocessors known as digital signal processors (DSPs) (e.g., like the encoder 205 in FIG. 2) to encode the digitized signal produced by an ADC (hereinafter, the "unencoded" signal). Depending on the particular system architecture, the unencoded signal may not be made available to software and/or hardware components on the mobile device other than the DSP implementing the speech encoder.

Even if the unencoded signal were available or could be decoded locally on the mobile device, mobile devices often lack sufficient resources (e.g., processing capabilities and/or memory capacities) for performing the type of computationally intensive endpointing processing conventionally performed on such a signal, let along for performing such processing and the processing necessary to decode the signal locally. Moreover, even if a mobile device did have sufficient resources, some of the resources may not be made available to applications by the computing environment in which the applications are running.

In accordance with some embodiments of the present disclosure, systems, methods, and apparatus are provided for performing endpoint detection not by analyzing the encoded signal, nor by decoding the encoded audio signal, but by analyzing information available from a speech encoder on a mobile device. For example, endpoint detection may be performed by a front end device using only information available from a speech encoder (e.g., as implemented by a DSP), without analyzing the unencoded signal output by an ADC, and without producing a decoded signal from the encoded signal using a speech decoder. In some embodiments, endpoint detection performed using only information from a speech encoder is relatively computationally unintensive and therefore suitable to the processing capabilities of the mobile device.

In some embodiments, endpoint detection may be performed on a front end device by interrogating state information of a speech encoder. For example, some speech encoders may be configured to maintain (e.g., as internal state information) an estimate of whether a segment of the input audio signal currently being processed is likely to represent human speech. Such an estimate is used conventionally to determine an appropriate rate of compression to be applied during the encoding. However, the inventors have recognized and appreciated that a new use for the state information is to detect non-speech to speech transitions (i.e., when speech starts) and/or speech to non-speech transitions (i.e., when speech ends) for the purpose of performing endpoint analysis.

In some alternate embodiments, endpoint detection may be performed on a front end device using one or more outputs of a speech encoder. For example, some speech encoders may be configured to output information indicating that a segment of the input audio signal currently being processed is unlikely to represent human speech. This type of output information is used conventionally in telephony applications to determine whether to transmit certain segments of the encoded signal (e.g., to conserve communication bandwidth). However, the inventors have recognized and appreciated that such output information produced by the speech encoder may be used for purposes of endpoint detection. For example, a speech to non-speech transition may be detected when the speech encoder produces an output indicating that transmission is to be temporarily halted. Conversely, a non-speech to speech transition may be detected when the speech encoder produces an output indicating that transmission is to be resumed.

In yet some further embodiments, endpoint detection may be performed on a front end device using at least a portion of the encoded signal output by a speech encoder. For example, the speech encoder may employ an encoding technique that results in the encoded signal comprising a plurality of parameters that can be used by a speech decoder to construct an approximation of the unencoded signal. The parameters may be generated based on an underlying model of how speech is produced (e.g., by modeling vocal cords as an acoustic source and vocal tract as an acoustic filter). The inventors have recognized and appreciated that some or all of the parameters in the encoded signal may be used for purposes of endpoint detection. For example, the inventors have recognized and appreciated that some encoding parameters are indicative of changes in energy in the audio signal, and that certain patterns of energy changes may indicate whether vowel sounds (or, more generally, voiced speech produced by vibration of vocal cords) is likely present in a corresponding segment of the input audio signal.

As one specific example, the speech encoder may employ an encoding technique based on linear predictive coding (LPC). The inventors have recognized and appreciated that a pitch gain parameter in an LPC-based encoded signal may be used for purposes of endpoint detection, because it may be indicative of whether voiced speech (e.g., vowel sounds) is likely present in a corresponding segment of the input audio signal.

It should be appreciated that the concepts introduced above and discussed in greater detail below may be implemented in any of numerous ways, as the disclosed concepts are not limited to any particular manner of implementation. For example, the present disclosure is not limited to the particular arrangements of components shown in the various figures, as other arrangements may also be suitable. Examples of specific implementations and applications are provided below solely for illustrative purposes.

Figure 3:
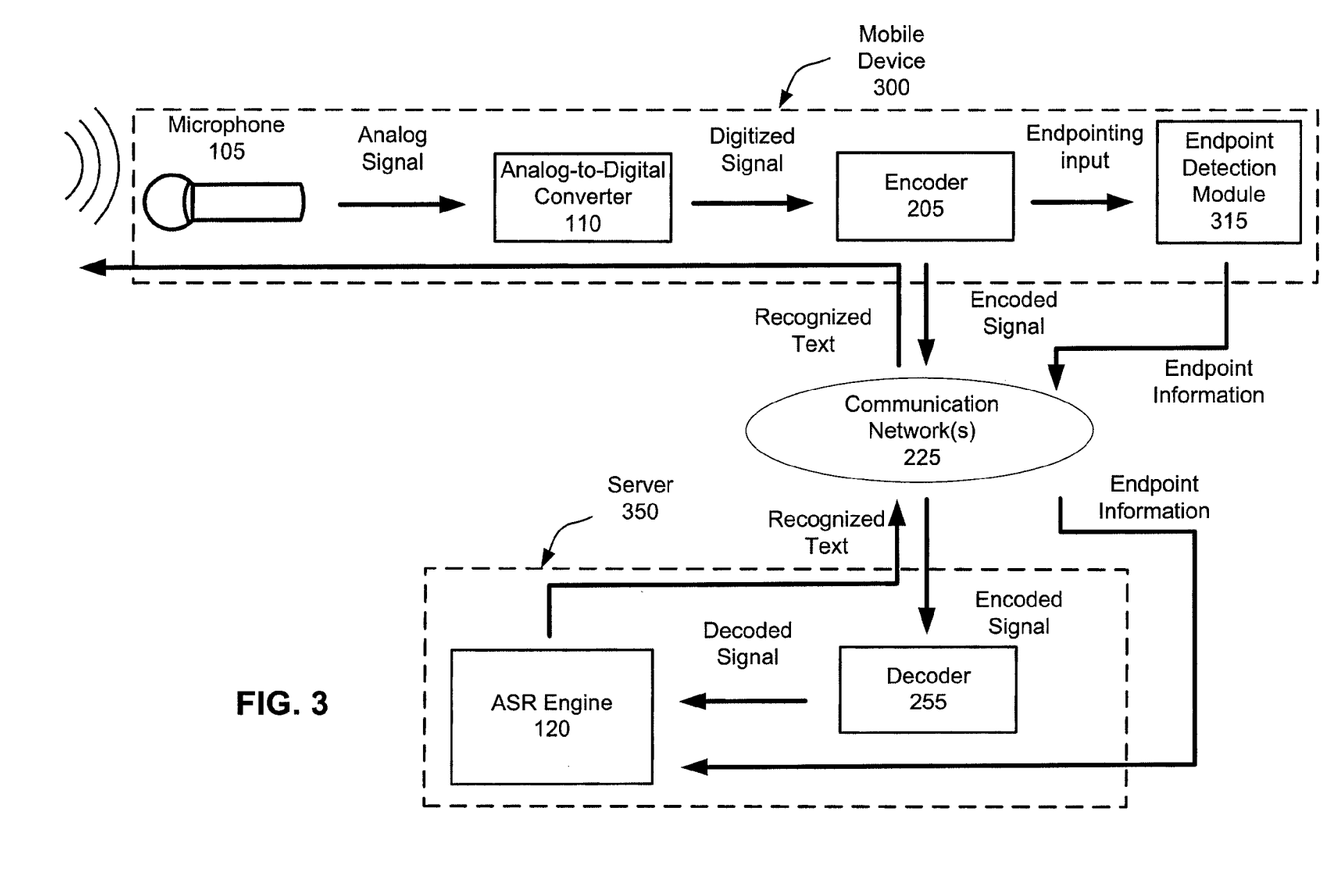
FIG. 3 shows an illustrative system for performing endpoint detection by analyzing information available from a speech encoder, in accordance with some embodiments.

FIG. 3 shows an illustrative system for performing endpoint detection by analyzing information available from a speech encoder, in accordance with some embodiments. In this example, the system includes a front end mobile device 300 that communicates with a backend server 350 over some suitable communication medium, such as one or more communication network(s) 225.

The network(s) 225 can be a public (e.g., the Internet) and/or private network of any type (e.g., wired, wireless, etc.) as the aspects of the present invention described herein are not limited to use in systems wherein a mobile device 300 is coupled to a backend serve 350 by any particular type of communication medium. The mobile device 300 includes a microphone 105 that converts sound waves into an electrical audio signal, and an analog-to-digital converter (ADC) 110 that digitizes the audio signal. The mobile device 300 may further include an encoder 205 that converts the digitized signal into an encoded signal that is transmitted to the server 350 over the communication network(s) 225. The server 350 includes a decoder 255 that decodes the received encoded signal. The output of the decoder 255 is a decoded signal that is provided to an ASR engine 120 for speech recognition processing. The recognized text output by the ASR engine 120 is returned to the mobile device 300 via the communication network(s) 225. (It may be transmitted back over the same communications medium or a different one, as aspects of the invention are not limited in this respect.) The received text may be processed by the mobile device 300 in any suitable manner (e.g., it may be displayed to a user of the mobile device 200, stored in a suitable storage device, provided to another application for further processing, etc., as the invention is not limited to any specific examples of potential uses of the transcribed text).

In addition to producing and transmitting the encoded signal, the mobile device 300 performs endpoint detection locally in accordance with one embodiment. The mobile device 300 includes an endpoint detection module 315 that receives one or more endpointing inputs from the encoder 205. As discussed in greater detail below in connection with FIG. 4, in various embodiments, the endpointing inputs may include, but are not limited to, internal state information of the encoder 205, one or more outputs of the encoder 205 that are distinct from the encoded signal, and/or part or all of the encoded signal output by the encoder 205. The endpoint detection module 315 may be configured to perform endpoint detection based on these one or more endpointing inputs, for instance, without analyzing the unencoded signal output by the ADC 110 and without decoding the encoded signal output by the encoder 205. Thus, the module 315 need not have access to the digitized signal and, in some embodiments, can do endpointing in a manner that is less computationally intensive than conventional techniques used on a decoded signal.

The endpoint detection module 315 may output endpoint information in various formats, as the aspects of the present invention described herein are not limited in that respect. For example, in some embodiments, the endpoint information may identify a likely location of a speech endpoint (e.g., a non-speech to speech transition or a speech to non-speech transition) in the encoded signal. As a more specific example, where the encoded signal includes a series of encoded speech frames, the endpoint information may identify one or more frames that are likely to contain a speech endpoint. For each such frame, the endpoint information may further identify whether it is likely to contain a non-speech to speech transition and/or a speech to non-speech transition.

In other embodiments, the endpoint information may additionally, or alternatively, indicate whether a segment of the encoded signal is likely to contain human speech. For example, the endpoint information may indicate, for a frame or sequence of frames in the encoded signal, whether the frame or sequence of frames is likely to contain speech or non-speech. As a more specific example, the endpoint information may include such an estimate for every frame in the encoded signal. These examples are non-limiting, as embodiments can identify an endpoint in any suitable way.

The endpoint information output by the endpoint detection module 315 may be used in any suitable manner, as the aspects of the present invention described herein are not limited in this respect. For instance, in the example shown in FIG. 3, part or all of the endpoint information may be transmitted to the server 350 over the communication network(s) 225 (e.g., over the same communication medium as used to transfer the encoded signal or different communication medium), and may be used by the ASR engine 120 speech recognition processing. Additionally, or alternatively, the endpoint information may be used locally at the mobile device 315 for any suitable purpose. For example, the endpoint information may be used locally to determine whether to transmit a portion of the encoded signal that is estimated to contain non-speech, to provide one or more system feedbacks to the user, and/or for any other suitable purpose. As a more specific example, in some embodiments, when a speech to non-speech transition is detected, a message may be rendered to the user visually, audibly, and/or in any other suitable manner, indicating that the system recognizes the user has stopped speaking and is processing the captured speech. This could be used to prompt the user to manually indicate that he has finished speaking (e.g., in a system where a manual mechanism such as a "Done" button is available) and the server 350 may process all of the recorded audio signal up to the point when the user provides the manual indication. Alternatively, the server 350 may perform a separate endpointing process to automatically detect end of speech. Again, these are examples of potential uses of endpoint information. Any combination of these and other suitable uses are possible, as aspects of the invention are not limited in this respect.

Although specific details of implementation are described above in connection in FIG. 3, it should be appreciated that such details are provided merely for purposes of illustration, and that the aspects of the present invention described herein are not limited to any of these specific examples. For instance, the device that performs the endpoint detection need not be a front end device that captures the input audio signal. Rather, it may receive the input audio signal, or a suitable representation thereof, from another device. Furthermore, the techniques described herein for performing endpoint detection are not limited to use with a mobile device and may be used with any other suitable device (e.g., a desktop computer).

The endpoint detection module 315 may be implemented in a number of different ways, as the aspects of the present invention described herein are not limited in this respect. For example, although the endpoint detection module 315 is shown in FIG. 3 as a component downstream from the encoder 205, it may in some alternative embodiments be implemented in a single component with the encoder (e.g., as a subcomponent of the encoder 205 so that the encoder 205 may be augmented with endpoint detection capabilities described herein in connection with the endpoint detection module 315). The endpoint detection module 315 may itself include any suitable number of subcomponents, which may be implemented in any suitable manner, including as being disposed on a single device or as being distributed over multiple devices in any suitable configuration.

Figure 4:
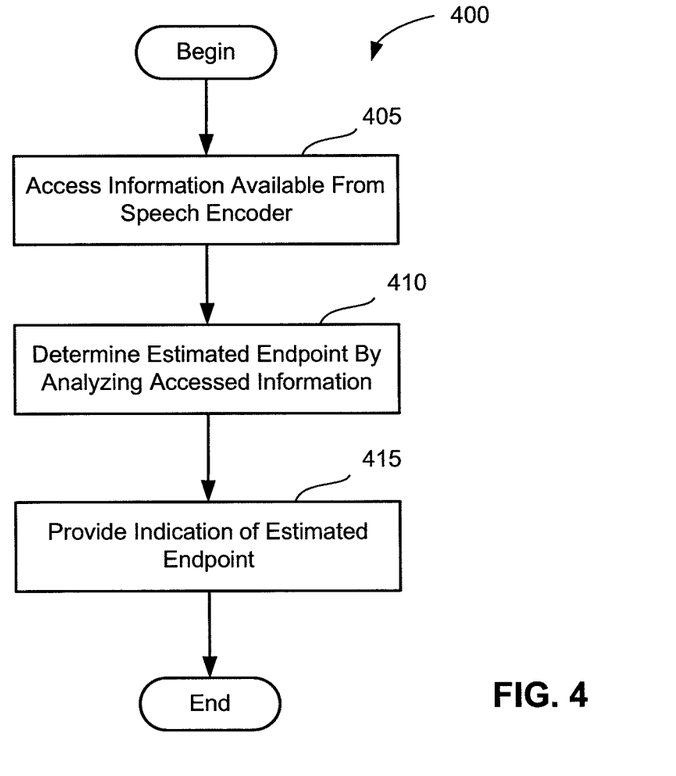
FIG. 4 shows an illustrative process for performing endpoint detection using information available from a speech encoder, in accordance with some embodiments.

FIG. 4 shows an illustrative process 400 that may be implemented by an endpoint detection module (e.g., the endpoint detection module 315 shown in FIG. 3) to perform endpoint detection using information available from a speech encoder (e.g., the encoder 205 shown in FIG. 3), in accordance with some embodiments. The process 400 may begin at act 405, where the endpoint detection module accesses information available from a speech encoder in any suitable manner. The accessed information may be analyzed by the endpoint detection module at act 410 to determine one or more estimated endpoints of human speech. This may be accomplished without analyzing the unencoded signal that is input to the speech encoder, and without decoding the encoded signal output by the speech encoder. The endpoint detection module may then provide an indication of the estimated endpoints at act 415.

The type of information accessed from the speech encoder 405 can take any of numerous forms, as aspects of the invention are not limited in this respect. In one non-limiting example, the endpoint detection module may, access state information from the speech encoder. For instance, some speech encoders maintain in their internal state an estimate of whether a segment of the input audio signal is likely to represent human speech, which estimate is used conventionally to determine an appropriate rate of compression to be applied during the encoding. In some embodiments, the endpoint detection module may, at act 405, access this estimate from the internal state of the speech encoder and use it to detect speech endpoints. For example, the endpoint detection module may, at act 410, monitor changes in this estimate over time. When the estimate changes from likely non-speech to likely speech, the endpoint detection module may determine that an estimated non-speech to speech transition (i.e., an endpoint when speech starts) has been detected. Similarly, when the estimate changes from likely speech to likely non-speech, the endpoint detection module may determine that an estimated speech to non-speech transition (i.e., an endpoint when speech ends) has been detected.

In some alternate embodiments, the endpoint detection module may use one or more outputs of the speech encoder to determine an estimated speech endpoint. For example, some speech encoders are configured to output information indicating that a segment of the input audio signal is unlikely to represent human speech. This type of output information is used conventionally in telephony applications to determine whether to transmit certain segments of an input audio signal. For instance, during a two-party telephone conversation, one party typically does not speak while the other party is speaking, making it unnecessary to transmit any audio signal from the device of the non-speaking party. Instead, the non-speaking party's device may transmit a special message to the speaking party's device indicating that transmission will be halted temporarily, until the non-speaking party starts to speak again. In some embodiments, the endpoint detection module may, at act 405, access such a special message produced by the speech encoder and use it for purposes of endpoint detection at act 410. For example, a speech to non-speech transition may be detected when the speech encoder produces a message indicating that transmission is to be temporarily halted. Conversely, a non-speech to speech transition may be detected when the speech encoder produces a message indicating that transmission is to be resumed.

In some other alternate embodiments, the endpoint detection module may analyze part or all of the encoded signal output by a speech encoder to estimate speech endpoints without decoding the encoded signal. For example, some speech encoders employ a model-based encoding technique, so that the encoded signal comprises a plurality of model parameters derived based on an underlying speech model. These parameters conventionally are used by a speech decoder to construct an approximation of the unencoded signal (e.g., to decode the signal). In some embodiments, some or all of the model parameters in the encoded signal may be accessed at act 405 and analyzed at act 410 to determine an estimated speech endpoint without decoding the signal. For instance, the inventors have recognized and appreciated that some model parameters may be indicative of changes in energy in the audio signal, and that certain patterns of energy changes may indicate whether a vowel sound has been produced. The inventors have further appreciated that detecting a voiced vowel can be an effective manner of detecting voiced speech. Thus, by analyzing model parameters indicative of changes in energy in the audio signal, it can be determined whether voiced speech is likely present in a corresponding segment of the input audio signal.

The aspect of the invention that relates to analyzing speech encoding model parameters to perform endpoint detection are not limited to use with speech encoders using any specific types of models, nor to analyzing any particular type of model parameters. In one specific example, the speech encoder may employ an encoding technique based on linear predictive coding (LPC). Under LPC, human speech is modeled as a signal produced by a buzzer at the end of a tube, where the buzzer is a model of the glottis whose vibrations produce voiced speech, and the tube is a model of the vocal tract (including the throat and the mouth) which filters the buzz produced by the glottis. Thus, a speech signal can be represented as the result of applying a filter to a source signal, where the filter represents characteristics of the vocal tract (modeled as a tube), and the source signal represents characteristics of the glottis (modeled as a buzzer).

The inventors have recognized and appreciated that one or more model parameters in an LPC-based encoded signal relating to the source signal are indicative of the presence of voiced speech (e.g., vowel sounds) and may be useful for purposes of endpoint detection. An example of such a model parameter is a "pitch gain" parameter, which may be indicative of an amount of energy present in a periodic component of the source signal. The inventors have recognized and appreciated that relatively high pitch gain values observed through a sustained period of time may be a good indication of the presence of voiced speech.

Examples of speech encoding techniques that provide a pitch gain parameter as part of an encoded signal include, but are not limited to, the Speex audio codec and the Adaptive Multi-Rate (AMR) audio codec. It should be appreciated that the example of pitch gain is provided merely for purposes of illustration, and that other types of model parameters may be analyzed in addition to, or instead of, pitch gain. Furthermore, aspects of the invention described herein may be employed in conjunction with any model-based encoding techniques, including, but not limited to, LPC-based encoding techniques.

In some embodiments, the process 400 may be repeated by the endpoint detection module on an ongoing basis. For example, at the beginning of a diction session (e.g., when a user indicates via a button or otherwise that dictation is beginning), the endpoint detection module may look for a starting point of speech (e.g., a non-speech to speech transition, or simply the likely presence of speech, in case the user began speaking before the device began to capture the input audio signal). Once it is determined that the user is likely to have begun speaking, the endpoint detection module may operate in a different mode and look for an ending point of speech (e.g., a speech to non-speech transition). Examples of these different modes of operation are described in further detail below in connection with FIG. 6. It should be appreciated that not all embodiments are limited to detecting both types of endpoints (i.e., start of speech and end of speech), as the techniques described herein may be used to detect either type of endpoints without detecting the other type.

Figure 5:
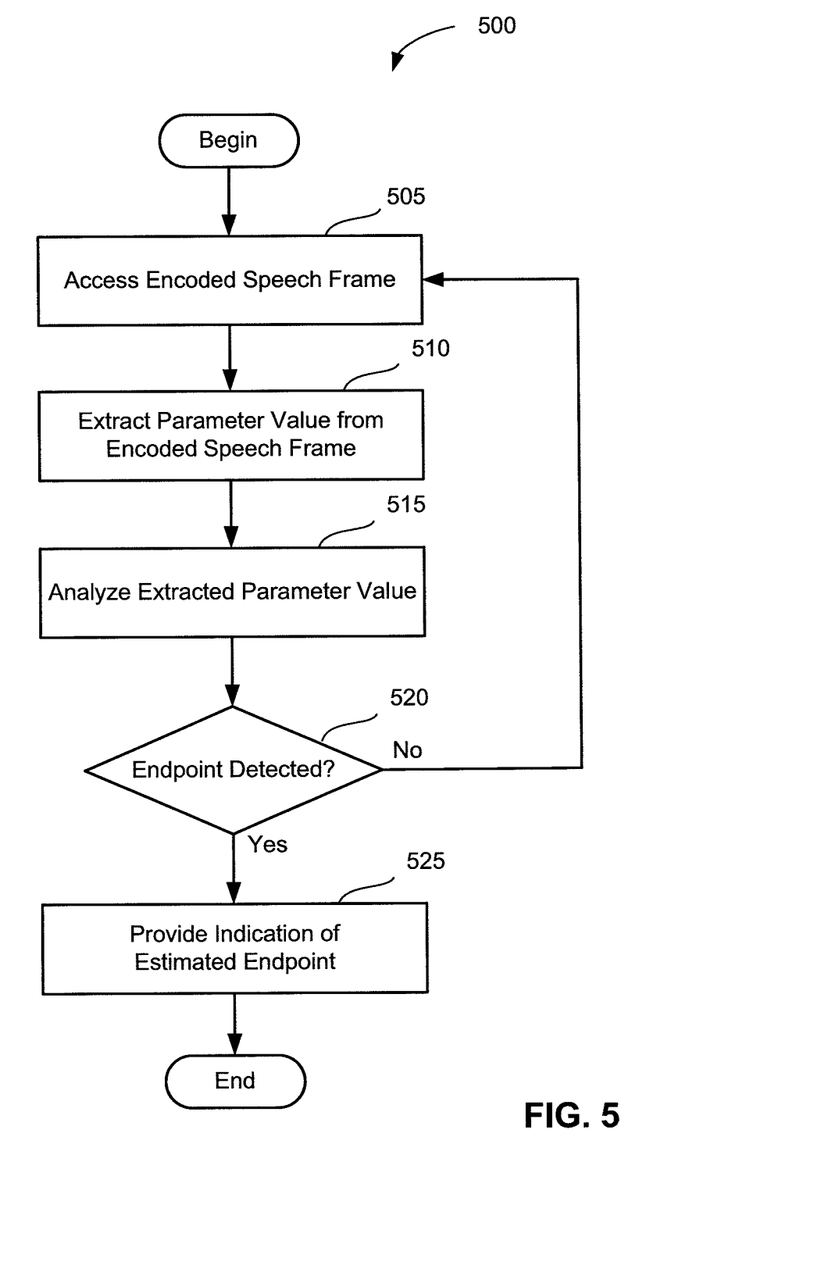
FIG. 5 shows an illustrative process for performing endpoint detection using an encoded signal output from a speech encoder, in accordance with some embodiments.

FIG. 5 shows an illustrative process 500 that may be implemented by an endpoint detection module (e.g., the endpoint detection module 315 shown in FIG. 3) to perform endpoint detection using an encoded signal output from a speech encoder (e.g., the encoder 205 shown in FIG. 3), in accordance with some embodiments. The encoded signal may include a series of encoded speech frames, each containing information regarding a segment of the input audio signal (e.g., a segment of 20 milliseconds or some other duration). Each encoded speech frame may include a plurality of model parameters derived based on an underlying speech model and a corresponding segment of the input audio signal. These model parameters may be used by a speech decoder to decode or reconstruct the corresponding segment of the input audio signal or an appropriate approximation thereof.

In the illustrated example, the endpoint detection module may, at act 505, access an encoded speech frame from the encoded signal. As discussed above, the encoded speech frame may include one or more model parameters that each represent some aspect of the input audio signal. In the example of LPC-based encoding, there may be model parameters characterizing the filter that models the vocal tract and the source signal that models the glottis. The endpoint detection module may, at act 510, analyze the encoded speech frame and extract therefrom one or more model parameter values of interest. For instance, the endpoint detection module may extract a parameter value relating to the source signal in an LPC model. As a more specific example, in some encoders, the source signal is represented as a weighted sum of a periodic component and an aperiodic component. The endpoint detection module may extract a pitch gain parameter value, which may be the weighting factor applied to the periodic component of the source signal and thus may be indicative of an amount of energy present in the periodic component of the source signal.

In some embodiments, each encoded speech frame may further include a number of subframes (e.g., four or some other number or subframes), each having its own model parameter values. A representative model parameter value may be derived based on the model parameter values of the subframes. For example, the representative model parameter value may be an average of the subframe model parameter values. As another example, the representative model parameter value may be an average of quantized index values corresponding to the subframe model parameter values. The average may be computed in any suitable manner, such as by taking a mean or median.

At act 515, the endpoint detection module may analyze the one or more extracted or representative parameter values and determine, at act 520, whether an estimated speech endpoint is detected based on the analysis. Various types of analysis may be performed during these acts, as aspects of the present invention that relate to analyzing model parameters are not limited in this respect. For instance, the endpoint detection module may determine whether an extracted or representative parameter value is above or below a selected threshold. Alternatively, or additionally, the endpoint detection module may maintain historical information about speech frames analyzed in the past, such as parameter values from a selected number (e.g., two, three, four, five, six, etc.) of immediately preceding frames and/or a moving average computed for those frames. The endpoint detection module may update the historical information based on the current extracted or representative parameter value and use the updated historical information to determine whether an estimated speech endpoint has been detected, for example, by comparing the moving average against a selected threshold. The use of historical information such as moving averages may reduce false positive determinations due noise in the input audio signal, because the effects of noise tend to be more spiky compared to the effects of voiced speech. A more detailed example of a process that can be used to determine an estimated speech endpoint is described below in connection with FIG. 6.

The parameter value threshold discussed above may be constant (e.g., selected at the beginning of a dictation session and unchanged throughout the session) or adaptive (e.g., dynamically adjusted one or more times during a dictation session). For example, in some embodiments, a lower threshold may be selected for detecting a speech to non-speech transition than for detecting a non-speech to speech transition (e.g., to accommodate effects of hysteresis). In alternate embodiments, the selected threshold may vary according to a duration of time since the last vowel event was detected. Other ways of adapting a threshold may also be suitable, as aspects of the present invention relating to adaptive thresholds are not limited to any particular examples.

If it is determined at act 520 that an estimated endpoint has been detected, the process 500 proceeds to act 525, where an indication of the estimated endpoint is provided. This may be done in any suitable manner, as the aspects of the present invention described herein are not limited in this respect. For example, the endpoint detection module may identify the current speech frame as likely to contain speech or likely to contain non-speech. Additionally, or alternatively, the endpoint detection module may indicate a transition (e.g., speech to non-speech or non-speech to speech) is likely to have occurred at, or shortly before, the current speech frame. Other suitable manners of indication may also be used. Furthermore, the indication may be provided to any suitable device or system component for any suitable use. For example, the indication may be provided (e.g., transmitted over any communication medium) as endpoint information to an ASR engine (e.g., the ASR engine 120 shown in FIG. 3).

If it is determined at act 520 that an estimated endpoint has not been detected, the process 500 returns to act 505 to analyze another encoded speech frame in the encoded signal. This next speech frame may be the frame immediately following the speech frame just analyzed. Alternatively, it may be any suitable number of frames subsequent to speech frame just analyzed, as aspects of the present invention are not limited to any specific level of granularity. In some embodiments, a number of frames (e.g., every other frame, or according to some other regular or irregular pattern) may be skipped in the analysis, for example, to reduce the amount of computation. This may cause a slight delay in detecting a speech endpoint, but the delay may be acceptable depending on a desired level of performance and/or user experience.

It should be appreciated that the illustrative process 500 may be employed in conjunction with any suitable encoding techniques, including, but not limited to Code Excited Linear Prediction (CELP) and its variants such as Algebraic Code Excited Linear Prediction (ACELP). Examples of coding/decoding schemes ("codecs") that use such encoding techniques include, but are not limited to, the Speex audio codec and the Adaptive Multi-Rate (AMR) audio codec, the latter of which has been adopted as part of the $3^{rd}$ Generation (3G) mobile phone system specifications. As a more specific example, techniques described herein can be used in conjunction with AMR operating at a bit rate of 12.20 kbits/sec, which is compatible with the Global System for Mobile Communications (GSM) Enhanced Full Rate speech coding standard, or the Enhanced Variable Rate Codec (EVRC), which is a variant of Qualcomm Code Excited Linear Prediction (QELP) and is used in North American Code Division Multiple Access (CDMA) networks.

Figure 6:
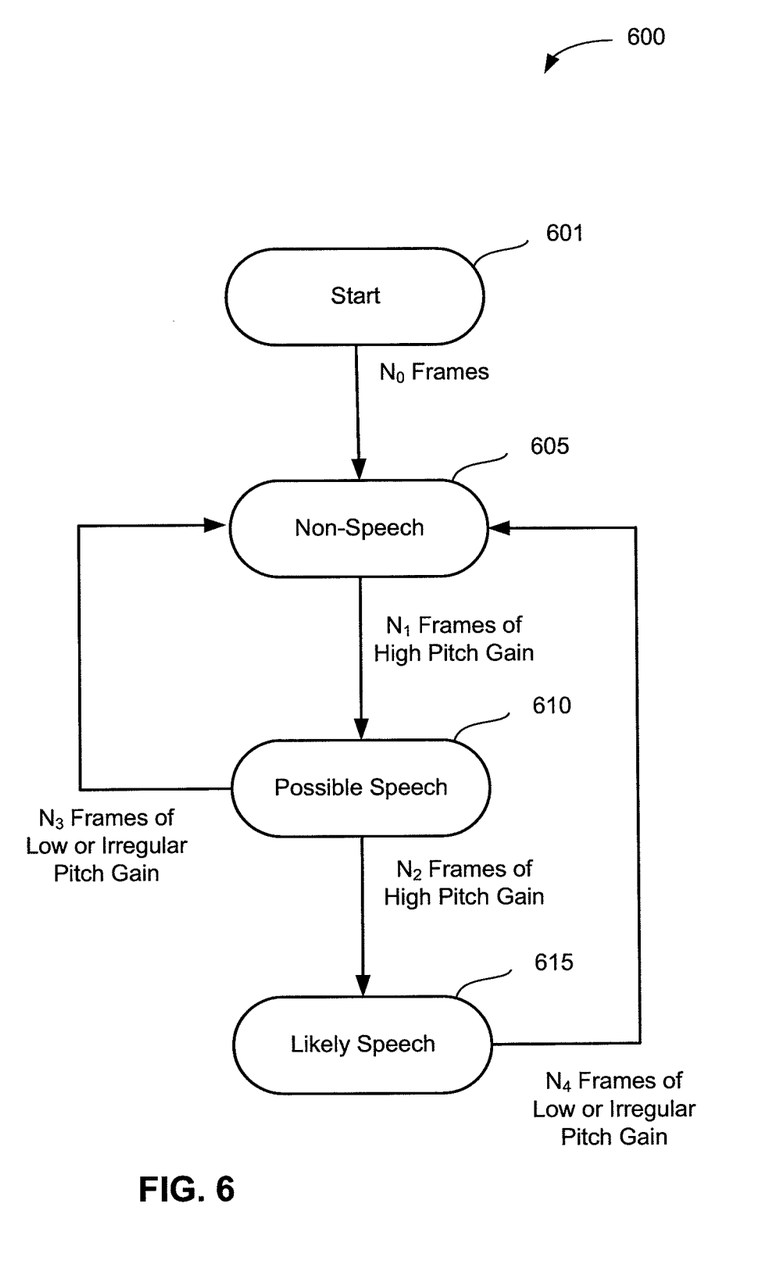
FIG. 6 shows an illustrative state machine for performing endpoint detection using an encoded signal output from a speech encoder, in accordance with some embodiments.

FIG. 6 shows an illustrative state machine 600 that may be used to implement an endpoint detection module (e.g., the endpoint detection module 315 shown in FIG. 3) to perform endpoint detection using an encoded signal output from a speech encoder (e.g., the encoder 205 shown in FIG. 3), in accordance with some embodiments. In this example, the speech encoder may employ an LPC-based encoding technique and may output encoded speech frames that include a pitch gain parameter. As discussed above in connection with FIG. 5, the endpoint detection module may be configured to extract values of the pitch gain parameter from the encoded speech frames and estimate a speech endpoint by analyzing the extracted values.

The illustrative state machine 600 includes four states, a "Start" state 601, a "Non-Speech" state 605, a "Possible Speech" state 610, and a "Likely Speech" state 615. At the beginning of a dictation session, the state machine 600 may start at the "Start" state 601 and may remain in that state for some period of time. For example, the state machine 600 may remain in the "Start" state 601 until $N_0$ frames (e.g., one, two, or three frames) have been received. In one embodiment, the state machine 600 stays in the "Start" state 601 for some number of frames (e.g., two, three, or more) because, during this initial period, the estimates of pitch gain may be unreliable because there is not yet a sufficient number of prior frames from which a stable estimate may be produced. Accordingly, in some embodiments, the pitch gain estimates from this initial period may be replaced by some suitable default value, such as a median index value for noise.

Once a sufficient number of initial frames have been received, the state machine 600 may transition from the "Start" state 601 to the "Non-Speech" state 605 and may remain in that state until a trigger condition is satisfied. The trigger condition may be any suitable indication that a possible starting point of speech is detected. For instance, the trigger condition may be observation of a high value of pitch gain for a specified period of time. A "high" value of pitch gain may be determined using a suitable threshold, which may be chosen to distinguish strong vowels from other sounds such as soft vowels, consonants and/or background noise. The exact value of the threshold may depend out how pitch gain is measured and represented in the particular codec. For example, in some embodiments for use with the AMR operating at a bit rate of 12.20 kbits/sec, pitch gain may be represented as an index value into a logarithmic quantization table, and a suitable threshold value for "high" pitch gain may be an index value of 4.5, although other values can be used.

As discussed above in connection with FIG. 5, a high value of pitch gain for a specified period of time may reduce false positive determinations due to noise-related spikes. Various techniques may be used to determine whether pitch gain has remained high for a sufficient period of time. For example, the initial trigger condition may require that pitch gain be above a selected "high" threshold for each of $N_1$ consecutive frames, where $N_1$ is any suitable threshold (e.g., five or some other number). Alternatively, the initial trigger condition may require that an average (e.g., mean, median and/or mode) pitch gain be above the selected "high" threshold over the $N_1$ consecutive frames. Both of these techniques may be effective in distinguishing strong vowels from noise. However, it should be appreciated that other techniques may also be suitable for reducing or smoothing out the effects of noise, such as applying a suitable filter to the input audio signal.

If the state machine 600 is in the "Non-Speech" state 605 and the initial trigger condition is satisfied, the state machine 600 may transition to the "Possible Speech" state 610, which may indicate that speech is possible but further evaluation will be performed before determining that speech is likely. The state machine 600 may remain in the "Possible Speech" state 610 until either of two following conditions are satisfied.

First, if the state machine 600 is in the "Possible Speech" state 610 and a high value of pitch gain is observed for another specified period of time, the state machine 600 may transition from the "Possible Speech" state 610 to the "Likely Speech" state 615, because the continued high level of pitch gain may confirm that the user has indeed started speaking. The "high" level of pitch gain may be specified in the same manner as for the initial trigger condition (e.g., using the same threshold), the threshold may be relaxed to a suitably lower threshold, or the threshold may be raised, as the aspects of the invention are not limited in this respect. Similarly, the duration threshold may be the same (i.e., $N_1$ consecutive frames), or a different duration of $N_2$ consecutive frames may be used, where $N_2$ may be any suitable value (e.g., three or any other suitable value).

Second, if the state machine 600 is in the "Possible Speech" state 610, and low or irregular values of pitch gain are observed for a specified period of time (e.g., $N_3$ consecutive frames, or five or ten seconds or any long period of time), the state machine 600 may transition from the "Possible Speech" state 610 back to the "Likely Speech" state 615. The "low" level of pitch gain may be defined using any suitable threshold, which may be chosen to distinguish vowels (both strong and soft) from other sounds such as consonants and/or background noise. Because vowel sounds occur frequently in all languages, a long period of low or irregular levels of pitch gain may be a good indication that the user is not speaking.

Again, the exact value of the threshold chosen may depend on how pitch gain is measured and represented in the particular codec. For example, in an embodiment where pitch gain is represented as an index value into a logarithmic quantization table in connection with the AMR operating at a bit rate of 12.20 kbits/sec, a suitable threshold value for "low" pitch gain may be 3.5 or other value.

If the state machine 600 is in the "Likely Speech" state 615, it may remain there until low or irregular values of pitch gain are observed for a moderately long period of time (e.g., $N_4$ consecutive frames, or 800 msec or some other duration that may be shorter than the long period discussed above), which may cause the state machine 600 to return to the "Non-speech" state 605. As discussed above, low or irregular values of pitch may be a good indication that the user is not speaking. Compared to the "Possible Speech" state 610, here it is more likely that the user has started speaking. Therefore, a shorter period of time (e.g., 800 msec, as opposed to five or ten seconds) may be sufficient to indicate that the user has stopped speaking. Of course, the same long threshold as discussed above (e.g., five or ten seconds or any long period of time) may also be used, as aspects of invention are not limited in this respect.

In some embodiments, an indication of a non-speech to speech transition may be provided each time the state machine 600 enters the "Likely Speech" state 615. Similarly, an indication of a speech to non-speech transition may be provided each time the state machine 600 returns to the "Non-speech" state 605 from another state. Furthermore, in the latter situation, a determination may be made whether to continue to capture and process the input audio signal.

It should be appreciated that the details of implementation described in connection with FIG. 6 are merely illustrative, as many other modes of operations may also be suitable. For example, an endpoint detection module may be implemented using a state machine having different states and/or transitions, such as a variant of the state machine 600 that does not have a designated "Start" state and instead starts at any of the three states, "Non-Speech," "Possible Speech," and "Likely Speech." In yet some other embodiments, an endpoint detection module may be implemented without using a deterministic state machine. For instance, an endpoint detection module may, instead, be implemented using a probabilistic framework (e.g., a hidden Markov model) where detected speech features are used to estimate likelihoods of an input audio signal containing one or more speech endpoints.

Figure 7:
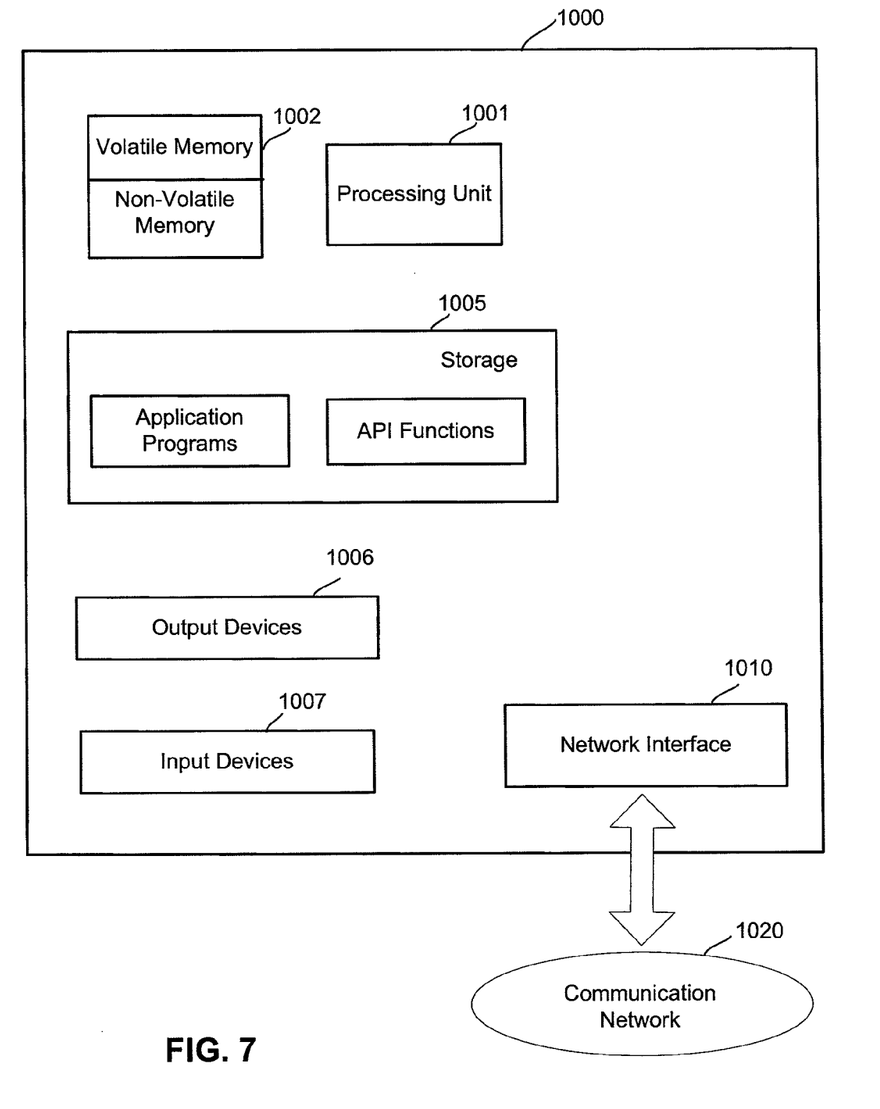
FIG. 7 shows, schematically, an illustrative computer on which various inventive aspects of the present disclosure may be implemented.

FIG. 7 shows, schematically, an illustrative computer 1000 on which any of the aspects of the present invention described herein may be implemented. For example, the computer 1000 may be a mobile device on which any of the features described in connection with the illustrative mobile device 300 shown in FIG. 3 may be implemented. As used herein, a "mobile device" may be any computing device that is sufficiently small so that it may be carried by a user (e.g., held in a hand of the user). Examples of mobile devices include, but are not limited to, mobile phones, pagers, portable media players, e-book readers, handheld game consoles, personal digital assistants (PDAs) and tablet computers. In some instances, the weight of a mobile device may be at most one pound, and/or the largest dimension of a mobile device may be at most six inches. Additionally, a mobile device may include features that enable the user to use the device at diverse locations. For example, a mobile device may include a power storage (e.g., battery) so that it may be used for some duration without being plugged into a power outlet. As another example, a mobile device may include a wireless network interface configured to provide a network connection without being physically connected to a network connection point.

In the embodiment shown in FIG. 7, the computer 1000 includes a processing unit 1001 that includes one or more processors and a non-transitory computer-readable storage medium 1002 that may include, for example, volatile and/or non-volatile memory. The computer 1000 may also include other types of non-transitory computer-readable medium, such as storage 1005 (e.g., one or more disk drives) in addition to the system memory 1002. The memory 1002 may store one or more instructions to program the processing unit 1001 to perform any of the functions described herein. The memory 1002 may also store one or more application programs and/or Application Programming Interface (API) functions.

The computer 1000 may have one or more input devices and/or output devices, such as devices 1006 and 1007 illustrated in FIG. 7. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, the input devices 1007 may include a microphone (e.g., the microphone 105 shown in FIG. 3) for capturing audio signals, and the output devices 1006 may include a display screen for visually rendering, and/or a speaker for audibly rendering, recognized text (e.g., the recognized text produced by the ASR engine 120 shown in FIG. 3).

As shown in FIG. 7, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present invention may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use in a system comprising a first device that receives human speech and a second device that comprises a speech recognizer, wherein the first device receives at least one sound wave comprising the human speech and encodes the received at least one sound wave, via at least one speech encoder in the first device, to produce at least one encoded representation of the at least one sound wave, wherein the first device transmits the at least one encoded representation to the second device, wherein the second device decodes the at least one encoded representation and performs, via the speech recognizer, speech recognition on the human speech, the method, performed by the first device, comprising acts of:

determining an estimated endpoint of the human speech in the at least one sound wave by analyzing information available from the at least one speech encoder, without analyzing the at least one sound wave and without producing a decoded representation of the at least one sound wave, wherein the encoded representation of the at least one sound wave comprises a plurality of speech frames, and wherein the act of determining an estimated endpoint of the human speech comprises analyzing information indicative of a change in energy level between two speech frames; and in addition to transmitting the at least one encoded representation to the second device, providing to the second device a separate indication of the estimated endpoint.

2. The method of claim 1, wherein the first device comprises a mobile telephone.

3. The method of claim 1, wherein the act of determining an estimated endpoint of the human speech comprises analyzing information indicative of a state of the at least one speech encoder.

4. The method of claim 1, wherein the act of determining an estimated endpoint of the human speech comprises analyzing information output from the at least one speech encoder.

5. The method of claim 1, wherein the act of determining an estimated endpoint of the human speech comprises analyzing information available from the at least one speech encoder that directly provides an estimate of an endpoint of human speech.

6. The method of claim 1, wherein the act of determining an estimated endpoint of the human speech comprises analyzing information available from the at least one speech encoder that directly provides an estimate of a presence or absence of human speech.

7. The method of claim 1, wherein the act of determining an estimated endpoint of the human speech comprises analyzing information comprising at least part of the encoded representation.

8. The method of claim 1, wherein the encoded representation comprises a plurality of parameters, and wherein the act of determining an estimated endpoint of the human speech comprises analyzing at least one but not all of the plurality of parameters.

9. The method of claim 1, wherein the at least one speech encoder encodes the at least one sound wave based on linear prediction, and wherein the act of determining an estimated endpoint of the human speech comprises analyzing a pitch gain parameter in the encoded representation.

10. The method of claim 1, wherein the act of determining an estimated endpoint of the human speech comprises analyzing information indicative of a periodic component of an amplitude of the at least one sound wave.

11. The method of claim 10, wherein the at least one speech encoder complies with an Adaptive Multi-Rate standard for codecs, and wherein the information indicative of a periodic component of an amplitude of the at least one sound wave comprises a pitch gain output of the at least one speech encoder.

12. The method of claim 1, wherein the act of determining an estimated endpoint of the human speech comprises analyzing information indicative of a voiced vowel in the at least one sound wave.

13. The method of claim 1, wherein the act of determining an estimated endpoint of the human speech comprises analyzing information indicative of a time-varying level of energy in the at least one sound wave.

14. The method of claim 1, wherein the change in energy level comprises a change in energy level of a periodic component of the at least one sound wave.

15. The method of claim 1, wherein the plurality of speech frames is a sequence of speech frames in time and the two speech frames are two consecutive speech frames in the sequence.

16. At least one non-transitory computer readable medium having encoded thereon instructions that, when executed by at least one processor, perform a method for use in a system comprising a first device that receives human speech and a second device that comprises a speech recognizer, wherein the first device receives at least one sound wave comprising the human speech and encodes the received at least one sound wave, via at least one speech encoder in the first device, to produce at least one encoded representation of the at least one sound wave, wherein the first device transmits the at least one encoded representation to the second device, wherein the second device decodes the at least one encoded representation and performs, via the speech recognizer, speech recognition on the human speech, the method, performed by the first device, comprising acts of:
   determining an estimated endpoint of the human speech in the at least one sound wave by analyzing information available from the at least one speech encoder, without analyzing the at least one sound wave and without producing a decoded representation of the at least one sound wave, wherein the encoded representation of the at least one sound wave comprises a plurality of speech frames, and wherein the act of determining an estimated endpoint of the human speech comprises analyzing information indicative of a change in energy level between two speech frames; and
   in addition to transmitting the at least one encoded representation to the second device, providing to the second device a separate indication of the estimated endpoint.

17. The at least one non-transitory computer readable medium of claim 16, wherein the first device comprises a mobile telephone.

18. The at least one non-transitory computer readable medium of claim 16, wherein the act of determining an estimated endpoint of the human speech comprises analyzing information indicative of a state of the at least one speech encoder.

19. The at least one non-transitory computer readable medium of claim 16, wherein the act of determining an estimated endpoint of the human speech comprises analyzing information output from the at least one speech encoder.

20. The at least one non-transitory computer readable medium of claim 16, wherein the act of determining an estimated endpoint of the human speech comprises analyzing information available from the at least one speech encoder that directly provides an estimate of an endpoint of human speech.

21. The at least one non-transitory computer readable medium of claim 16, wherein the act of determining an estimated endpoint of the human speech comprises analyzing information available from the at least one speech encoder that directly provides an estimate of a presence or absence of human speech.

22. The at least one non-transitory computer readable medium of claim 16, wherein the act of determining an estimated endpoint of the human speech comprises analyzing information comprising at least part of the encoded representation.

23. The at least one non-transitory computer readable medium of claim 16, wherein the encoded representation comprises a plurality of parameters, and wherein the act of determining an estimated endpoint of the human speech comprises analyzing at least one but not all of the plurality of parameters.

24. The at least one non-transitory computer readable medium of claim 16, wherein the at least one speech encoder encodes the at least one sound wave based on linear prediction, and wherein the act of determining an estimated endpoint of the human speech comprises analyzing a pitch gain parameter in the encoded representation.

25. The at least one non-transitory computer readable medium of claim 16, wherein the act of determining an estimated endpoint of the human speech comprises analyzing information indicative of a periodic component of an amplitude of the at least one sound wave.

26. The at least one non-transitory computer readable medium of claim 25, wherein the at least one speech encoder complies with an Adaptive Multi-Rate standard for codecs, and wherein the information indicative of a periodic component of an amplitude of the at least one sound wave comprises a pitch gain output of the at least one speech encoder.

27. The at least one non-transitory computer readable medium of claim 16, wherein the act of determining an estimated endpoint of the human speech comprises analyzing information indicative of a voiced vowel in the at least one sound wave.

28. The at least one non-transitory computer readable medium of claim 16, wherein the act of determining an estimated endpoint of the human speech comprises analyzing information indicative of a time-varying level of energy in the at least one sound wave.

29. The at least one non-transitory computer readable medium of claim 16, wherein the change in energy level comprises a change in energy level of a periodic component of the at least one sound wave.

30. The at least one non-transitory computer readable medium of claim 16, wherein the plurality of speech frames is a sequence of speech frames in time and the two speech frames are two consecutive speech frames in the sequence.

31. A first device for use in a system comprising at least one second device configured to decode at least one encoded representation of at least one sound wave comprising human speech, the at least one second device comprising a speech recognizer to perform speech recognition on the human speech, the first device comprising:

at least one speech encoder to encode the at least one sound wave to produce the at least one encoded representation, the at least one sound wave being received at the first device;

at least one endpoint detection circuit to determine an estimated endpoint of the human speech in the at least one sound wave by analyzing information available from the at least one speech encoder, without analyzing the at least one sound wave and without producing a decoded representation of the at least one sound wave, wherein the encoded representation of the at least one sound wave comprises a plurality of speech frames, and wherein the at least one endpoint detection circuit is configured to determine an estimated endpoint of the human speech at least in part by analyzing information indicative of a change in energy level between two speech frames; and at least one transmitter to transmit the at least one encoded representation of the at least one sound wave and a separate indication of the estimated endpoint to the at least one second device.

32. The first device of claim 31, comprising a mobile telephone.

33. The first device of claim 31, wherein the at least one endpoint detection circuit is configured to determine an estimated endpoint of the human speech at least in part by analyzing information indicative of a state of the at least one speech encoder.

34. The first device of claim 31, wherein the at least one endpoint detection circuit is configured to determine an estimated endpoint of the human speech at least in part by analyzing information output from the at least one speech encoder.

35. The first device of claim 31, wherein the at least one endpoint detection circuit is configured to determine an estimated endpoint of the human speech at least in part by analyzing information available from the at least one speech encoder that directly provides an estimate of an endpoint of human speech.

36. The first device of claim 31, wherein the at least one endpoint detection circuit is configured to determine an estimated endpoint of the human speech at least in part by analyzing information available from the at least one speech encoder that directly provides an estimate of a presence or absence of human speech.

37. The first device of claim 31, wherein at least one endpoint detection circuit is configured to determine an estimated endpoint of the human speech at least in part by analyzing information comprising at least part of the encoded representation.

38. The first device of claim 31, wherein the encoded representation comprises a plurality of parameters, and wherein the at least one endpoint detection circuit is configured to determine an estimated endpoint of the human speech at least in part by analyzing at least one but not all of the plurality of parameters.

39. The first device of claim 31, wherein the at least one speech encoder encodes the at least one sound wave based on linear prediction, and wherein the at least one endpoint detection circuit is configured to determine an estimated endpoint of the human speech at least in part by analyzing a pitch gain parameter in the encoded representation.

40. The first device of claim 31, wherein the at least one endpoint detection circuit is configured to determine an estimated endpoint of the human speech at least in part by analyzing information indicative of a periodic component of an amplitude of the at least one sound wave.

41. The first device of claim 40, wherein the speech encoder complies with an Adaptive Multi-Rate standard for codecs, and wherein the information indicative of a periodic component of an amplitude of the at least one sound wave comprises a pitch gain output of the at least one speech encoder.

42. The first device of claim 31, wherein the at least one endpoint detection circuit is configured to determine an estimated endpoint of the human speech at least in part by analyzing information indicative of a voiced vowel in the at least one sound wave.

43. The first device of claim 31, wherein the at least one endpoint detection circuit is configured to determine an estimated endpoint of the human speech at least in part by analyzing information indicative of a time-varying level of energy in the at least one sound wave.

44. The first device of claim 31, wherein the change in energy level comprises a change in energy level of a periodic component of the at least one sound wave.

45. The first device of claim 31, wherein the plurality of speech frames is a sequence of speech frames in time and the two speech frames are two consecutive speech frames in the sequence.

46. The first device of claim 31, in combination with the at least one second device.

47. The first device of claim 31, wherein the at least one endpoint detection circuit comprises at least one processor programmed to perform endpoint detection.

* * * * *